Oct. 4, 1932.     F. J. COOK ET AL     1,880,822
ELECTRIC OVEN
Filed Sept. 26, 1930     3 Sheets-Sheet 2

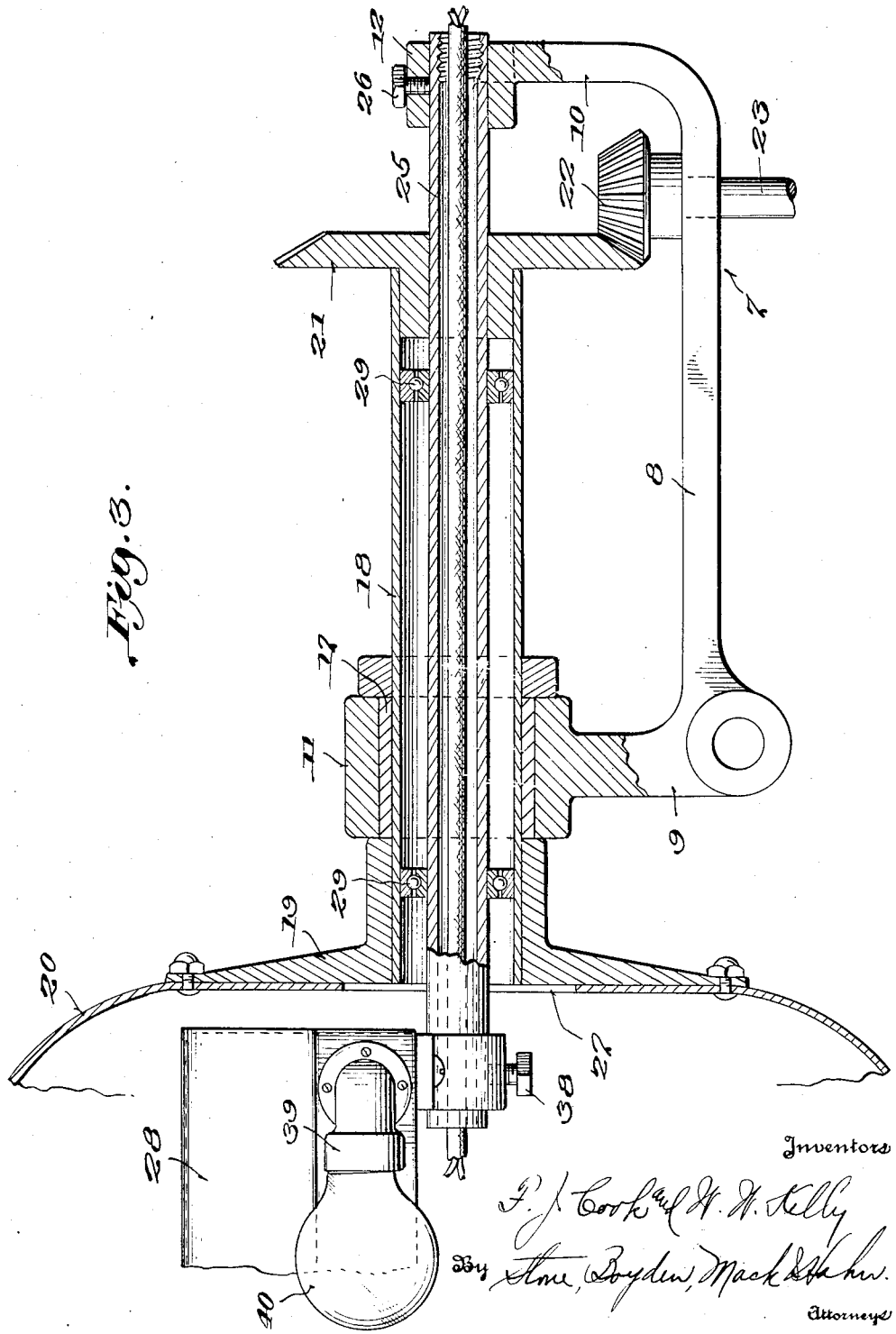

Patented Oct. 4, 1932

1,880,822

UNITED STATES PATENT OFFICE

FRANK J. COOK AND WILLIAM WILLARD KELLY, OF CLEVELAND, OHIO, ASSIGNORS, BY MESNE ASSIGNMENTS, TO THE NUT PRODUCTS COMPANY

ELECTRIC OVEN

Application filed September 26, 1930. Serial No. 484,636.

This invention relates to electric ovens and has particular reference to an electrically heated oven for roasting, toasting, drying, or warming edible materials such as nuts, cereals, coffee or other similar foodstuffs.

The primary object of the present invention is to provide an electric oven consisting of a rotatable container having a stationary electric heater therein of such construction that the heat rays therefrom shall be concentrated on a relatively small area of the container wherein the materials are constantly tumbled to expose all surfaces thereof to the heat.

Another object is to provide an electric oven which may be easily and quickly charged with material and which shall form an attractive counter display while in operation.

A further object is to provide an electric oven of the above character which shall be highly efficient in operation and which shall consist of few parts that are simple in construction and inexpensive to manufacture.

With foregoing and other objects in view, the invention may be stated to consist in the various novel features of construction and arrangement or combination, all of which will be fully described hereinafter and pointed out in the appended claims.

Figure 1:
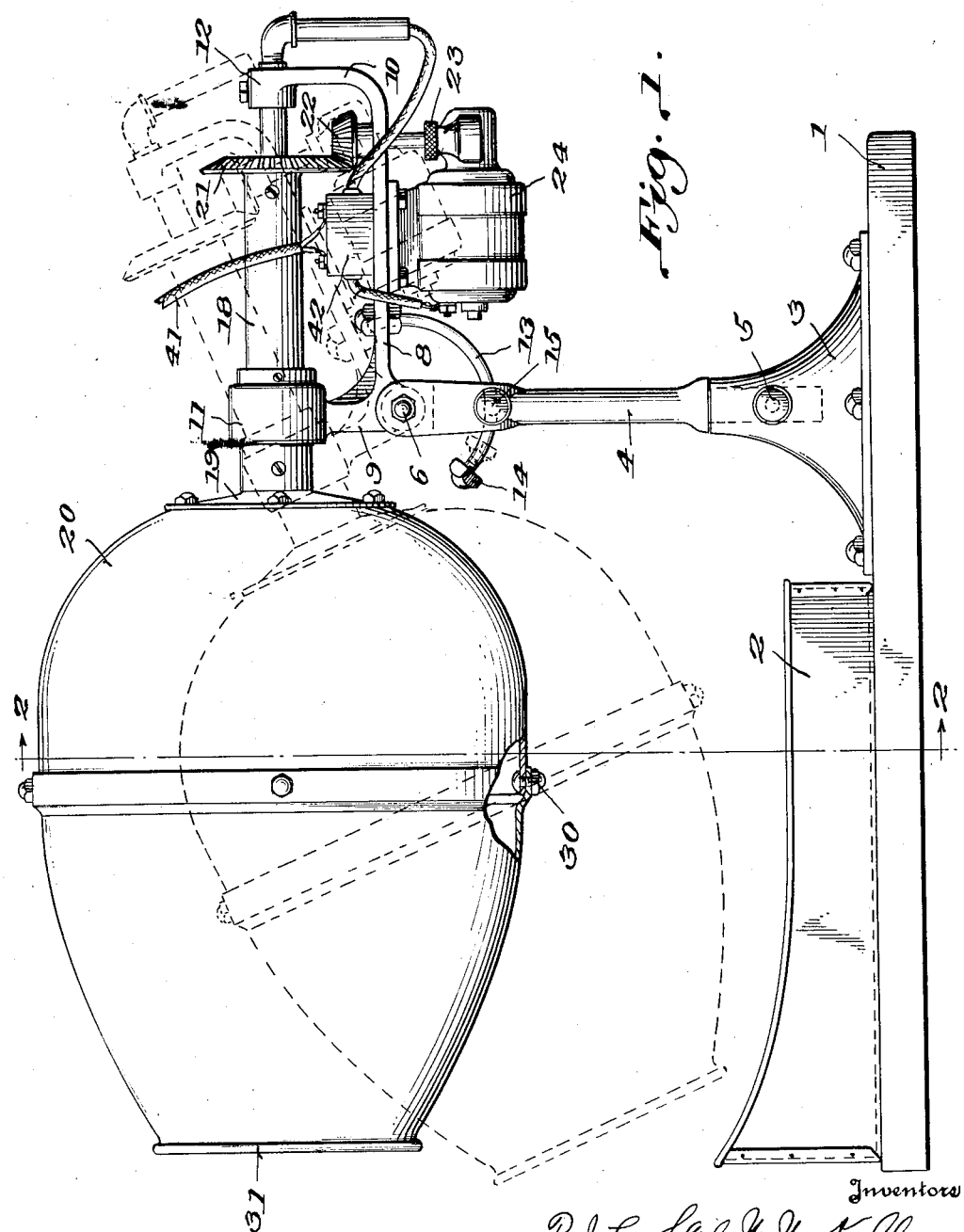
Figure 2:
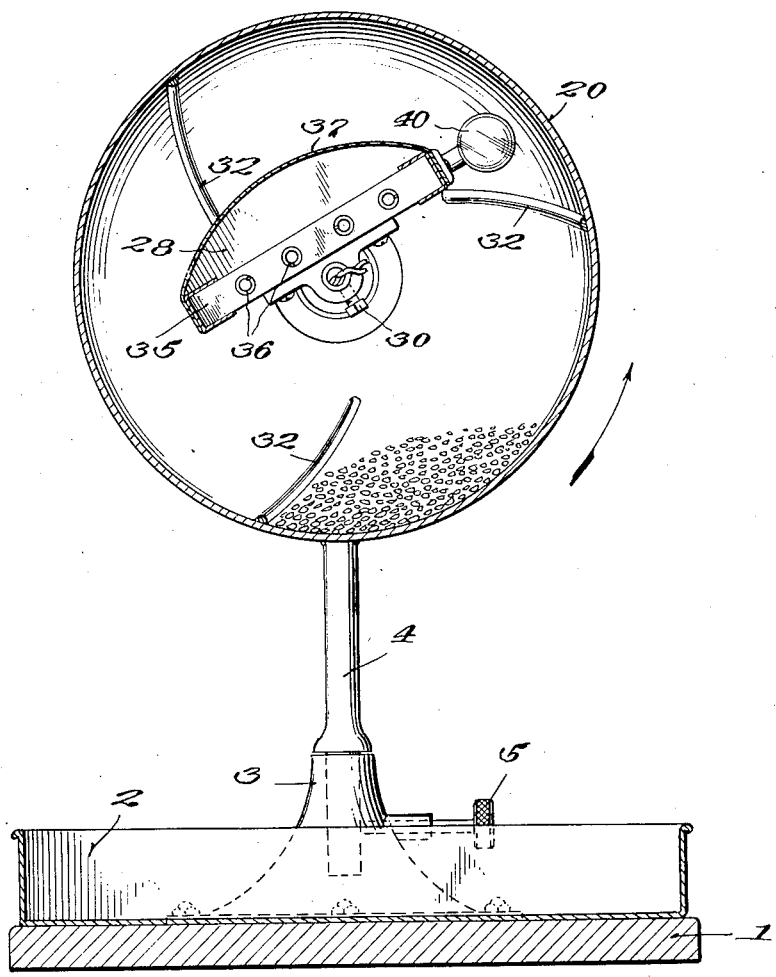

In the drawings accompanying and forming a part of this application, Fig. 1 is a side elevation of an electric oven constructed in accordance with our invention;

Fig. 2 is a transverse sectional view taken in the line 2—2 of Fig. 1; and Fig. 3 is a fragmentary longitudinal sectional view through the device.

An electric oven constructed in accordance with our invention consists of a suitable base 1 on which is mounted a container or pan 2 and a pedestal 3. The pedestal 3 is socketed to receive a vertically disposed standard 4 which is rotatably mounted in the socket and normally retained in position by an adjusting screw 5. The upper end of the standard 4 has pivoted thereto at 6, a U-shaped bracket 7. This bracket comprises a horizontal portion 8 and vertically disposed arms 9 and 10, the upper ends whereof have enlargements 11 and 12. A curved arm 13 is fastened to the horizontal portion 8 of the bracket and projects through an aperture in standard 4. The free end of this arm is fitted with a nut 14 or other enlargement to prevent disengagement of the arm with standard 4 when the device is tipped forward as indicated in dotted lines in Fig. 1. A thumb nut 15 which is threaded into the standard 4 engages arm 13 to hold the bracket and associated parts in any desired position.

By referring to Fig. 3, it will be noted that the enlargement 11 on arm 9 is fitted with a bearing bushing 17 in which is rotatably mounted a tubular sleeve 18. The forward end of this sleeve is fitted with a face plate 19, to which is bolted or otherwise secured a substantially cylindrical container or oven 20. The rear end of tube 18 has fastened thereto a bevelled gear 21 which is adapted to mesh with a bevelled drive pinion 22. This drive pinion is carried by a vertical disposed shaft 23 which extends through the horizontal portion 8 of bracket 7 and the lower end of this shaft is operatively connected with a prime mover such as an electric motor 24. The motor is conveniently mounted on the lower side of the horizontal portion 8 of bracket 7.

A stationary tube 25 is positioned within tubular sleeve 18 and one end of this tube 25 is fastened to the enlargement 12 of bracket 7 by means of a set screw 26. The opposite end of tube 25 projects through an opening 27 in the oven 20 and has mounted thereon an electric heater denoted generally at 28. Suitable bearings 29 are interposed between the tube 25 and the tubular sleeve 18 so that the sleeve 18 may rotate with respect to tube 25.

Referring to Figs. 1 and 3 it will be seen that the container or oven 20 is formed in two parts along its transverse axis and these two parts interfit and are normally secured together by screws 30 or other suitable fastening means. The forward end of the container or oven 20 is provided with a receiving and discharge opening 31 which is preferably of a diameter less than the diameter through a transverse axis of the container, so that when the device is in a horizontal position as shown in Fig. 1, the materials within the container will not escape through opening 31 while the device is in operation. Disposed on the inner surface of the container 20 are a plurality of helically arranged ribs 32 which serve to tumble or turn the materials within the container and thus expose all surfaces thereof to the source of heat.

The heater 28 which is disposed within the oven 20 is of the radiant type. This heater consists of a plurality of transversally disposed supports 35 through which are laced a plurality of longitudinal disposed heating coils 36. A reflector 37 normally encloses the upper surface of the heater and serves to concentrate the heat rays from the elements 36 over a relatively small area of the container. The heater is mounted as a unit on the forward end of the tube 25 as previously described and a set screw 38 permits the heater to be retained in any desired angular position. Mounted on one side of the heater is a socket 39 which is adapted to receive an electric light bulb 40. This bulb may be of any suitable color and its function is to illuminate the interior of the container so that the contents may be readily observed during the heating operation and will also serve to attract customers to the display.

Current for the device is brought by a pair of conductors 41 to a control box 42 that is mounted on the horizontal portion 8 of bracket 7. From this control box, a pair of conductors extends to the electric motor 24 and a second pair of conductors extends from the control box through tube 25 to the heater 28 and electric light 40.

In operation, with the parts arranged as shown in full lines in Fig. 1, the oven 20 is charged with materials through opening 31. The current is turned on to energize motor 24 and heater 28 and electric light 40. Motor 24 will rotate oven 20 through the aforementioned gears 22 and 21. As the oven 20 rotates the materials therein will tend to pile up on the right hand side of the vertical axis of the oven as shown in Fig. 2 and continued rotation of the oven will cause these materials to fall back by gravity over the ribs 32, whereupon they will be tumbled and turned to expose all surfaces thereof. While the materials are thus being tumbled and turned they will be constantly exposed to the heat rays from electric heater 28. When the roasting, toasting, warming or drying operation is completed, thumb nut 15 is loosened to allow the device to tip forwardly as indicated in dotted lines in Fig. 1 whereupon the contents of the oven 20 will be discharged into pan 2. If it is desired to discharge the contents of the oven in any other container, the thumb nut 5 may be loosened and the entire mechanism swung about a vertical axis to position the discharge opening 31 over any other container.

The device is relatively small and compact and is intended to be mounted directly upon a store counter or other suitable support so that customers may observe and be attracted by the device while in operation. By providing a heater wherein the heat rays are concentrated over a relatively small area of the container, a high degree of efficiency is obtained due to the fact that all the heat rays are concentrated on the material and no loss is incurred due to the heat rays being radiated over the entire inner surface of the container. In actual practice, it has been found that with a device employing a reflector type of heater therein so as to concentrate the heat rays, 750 watts of electrical energy have accomplished the same results as 2,000 watts of electrical energy when an ordinary type of heating element is used and the heat rays are allowed to radiate in all directions therefrom.

What we claim is:

1. A device of the character set forth comprising a base, a standard rising from said base, an oven rotatably mounted on said standard, means for rotating said oven, a stationary electric heater disposed within said oven, means for concentrating the heat rays from said heater over a relatively small area of said oven, and means for adjusting the position of said heater with respect to said oven whereby to change the position of the area of concentration of heat rays.

2. A device of the character set forth comprising a base, a standard rising from said base, a bracket carried by said standard, a tubular shaft journalled in said bracket, an oven carried by said shaft, a prime mover carried by said bracket and operatively connected to said shaft, a conduit disposed within said shaft and projecting within said oven, and an electric heater carried by said conduit and disposed within said oven.

3. A device of the character set forth comprising a base, a standard rising from said base, a bracket carried by said standard, a tubular shaft journalled in said bracket, an oven carried by said shaft, a prime mover carried by said bracket and operatively connected to said shaft, a conduit disposed within said shaft and projecting within said oven, an electric heater carried by said conduit and disposed within said oven, and means for adjusting said bracket and associated parts in a vertical plane as a unit with respect to said standard.

4. A device of the character set forth comprising a base, a standard rising from said base, a bracket carried by said standard, a tubular shaft journalled in said bracket, an oven carried by said shaft, an electric motor carried by said bracket and operatively connected to said shaft, said oven being normally closed with the exception of a restricted opening at one end, a conduit disposed within said shaft and projecting within said oven, an electric heater carried by said conduit and disposed within said oven, means for adjusting said bracket and associated parts in a vertical plane, and means for adjusting said standard about a vertical axis.

In testimony whereof we affix our signatures.

FRANK J. COOK.
WILLIAM WILLARD KELLY.